US012260976B2

(12) United States Patent
Ikeda et al.

(10) Patent No.: US 12,260,976 B2
(45) Date of Patent: Mar. 25, 2025

(54) MAGNETIC BEAD AND MAGNETIC BEAD DISPERSION

(71) Applicant: SEIKO EPSON CORPORATION, Tokyo (JP)

(72) Inventors: Yasunari Ikeda, Shiojiri (JP); Michio Nakamori, Matsumoto (JP); Hirofumi Hokari, Chino (JP)

(73) Assignee: SEIKO EPSON CORPORATION (JP)

(*) Notice: Subject to any disclaimer, the term of this patent is extended or adjusted under 35 U.S.C. 154(b) by 0 days.

(21) Appl. No.: 18/191,096

(22) Filed: Mar. 28, 2023

(65) Prior Publication Data

US 2023/0317332 A1 Oct. 5, 2023

(30) Foreign Application Priority Data

Mar. 29, 2022 (JP) ................................ 2022-053050

(51) Int. Cl.
*H01F 1/153* (2006.01)
*B22F 1/052* (2022.01)
(Continued)

(52) U.S. Cl.
CPC .......... *H01F 1/15383* (2013.01); *B22F 1/052* (2022.01); *B22F 1/07* (2022.01);
(Continued)

(58) Field of Classification Search
CPC ............. H01F 1/14733; H01F 1/14766; H01F 1/14791; H01F 1/1535; H01F 1/15383; H01F 1/20; H01F 1/22; H01F 1/24; H01F 1/28; H01F 1/34; B22F 1/052; B22F 1/07; B22F 1/08; B22F 1/147; B22F 1/16;
(Continued)

(56) References Cited

U.S. PATENT DOCUMENTS 7,179,660 B1* 2/2007 Kirakossian ......... G01N 33/548
435/969
2007/0235109 A1* 10/2007 Maeda ...................... B22F 1/16
148/307
(Continued)

FOREIGN PATENT DOCUMENTS

CN 113414383 A * 9/2021
JP H11-262387 A 9/1999
(Continued)

OTHER PUBLICATIONS

Sugimura, K. et al. "Novel Method for Making Surface Insulation Layer on Fe-Based Amorphous Alloy Powder by Surface-Modification Using Two-Step Acid Solution Processing," IEEE Transactions on Magnetics, vol. 54, No. 11 (Year: 2018).*

*Primary Examiner* — Ricardo D Morales
(74) *Attorney, Agent, or Firm* — Harness, Dickey & Pierce, P.L.C.

(57) ABSTRACT

A magnetic bead contains: a magnetic metal powder; and a coating layer with which a particle surface of the magnetic metal powder is coated. When the magnetic bead is left to stand in a state of a dispersion obtained by dispersing the magnetic bead in water, a time until an initial absorbance of the dispersion attenuates to 80% of an absorbance when the standing is started is 90 seconds or longer.

6 Claims, 3 Drawing Sheets

(51) Int. Cl.
*B22F 1/07* (2022.01)
*B22F 1/08* (2022.01)
*B22F 1/145* (2022.01)
*B22F 9/08* (2006.01)

(52) U.S. Cl.
CPC ................ *B22F 1/08* (2022.01); *B22F 1/147* (2022.01); *B22F 2009/0804* (2013.01); *B22F 2301/35* (2013.01)

(58) Field of Classification Search
CPC .......... B22F 2009/0804; B22F 2301/35; B22F 2302/256
See application file for complete search history.

(56) References Cited

U.S. PATENT DOCUMENTS

| | | | | |
|---|---|---|---|---|
| 2017/0283791 | A1* | 10/2017 | Fukushima | B03C 1/01 |
| 2019/0279801 | A1* | 9/2019 | Yoshidome | H01F 1/38 |

FOREIGN PATENT DOCUMENTS

| | | | | |
|---|---|---|---|---|
| JP | 2016-015357 | A | | 1/2016 |
| JP | 2019033114 | A | * | 2/2019 |

* cited by examiner

MAGNETIC BEAD AND MAGNETIC BEAD DISPERSION

The present application is based on, and claims priority from JP Application Serial Number 2022-053050, filed Mar. 29, 2022, the disclosure of which is hereby incorporated by reference herein in its entirety.

BACKGROUND

1. Technical Field

The present disclosure relates to a magnetic bead and a magnetic bead dispersion.

2. Related Art

In recent years, in a diagnosis in the medical field and in the field of life science, there is an increasing demand for testing biological substances. Among biological substance testing methods, a polymerase chain reaction (PCR) method is a method of extracting a nucleic acid such as DNA or RNA, and specifically amplifying and detecting the nucleic acid. In a process of testing such a biological substance, first, it is necessary to extract a substance to be tested from a specimen. A magnetic separation method using magnetic beads is widely used for such biological substance extraction. In the magnetic separation method, a biological substance to be extracted is extracted by applying a magnetic field by using magnetic beads having a function of carrying the biological substance. Specifically, after the magnetic beads having the function of carrying the substance to be tested on surfaces thereof are dispersed in a dispersion medium, an obtained dispersion is attached to a magnetic field generating device such as a magnetic stand, and ON and OFF of magnetic field application are repeated a plurality of times. Accordingly, the substance to be tested is extracted. Since such a magnetic separation method is a method of separating and collecting the magnetic beads by a magnetic force, a separation operation can be performed rapidly.

In addition, the magnetic separation method is used not only in extraction performed by the PCR method but also in fields of protein purification, separation and extraction of exosomes and cells, or the like.

For example, JP-A-11-262387 discloses a nucleic-acid-binding magnetic carrier that is a magnetic silica particle containing a superparamagnetic metal oxide, and the magnetic silica particle has an external surface area of at least 50 $m^2/g$. Since such a nucleic-acid-binding magnetic carrier contains the superparamagnetic metal oxide, a cycle of magnetic separation and re-dispersion can be repeated. In addition, since the external surface area is large, a nucleic acid can be efficiently collected from a biological sample.

The nucleic-acid-binding magnetic carrier disclosed in JP-A-11-262387 is the magnetic silica particle containing the superparamagnetic metal oxide, and thus saturation magnetization thereof is small. Therefore, a separation speed thereof in magnetic separation may be low. In addition, if a ratio of the superparamagnetic metal oxide is increased to increase the saturation magnetization of the magnetic silica particle, or a particle size of the magnetic silica particle is increased to increase the saturation magnetization, the magnetic silica particle is likely to sediment. In this case, when a dispersion containing the magnetic silica particle is fractionated by a pipette or the like, an amount of the dispensed magnetic silica particle tends to vary. Accordingly, testing accuracy of the biological substance may be reduced.

Therefore, an object of the present disclosure is to increase accuracy of a pretreatment involving fractionation of magnetic beads and the like while increasing a separation speed in magnetic separation, thereby increasing testing accuracy of an extracted biological substance.

SUMMARY

A magnetic bead according to an application example of the present disclosure contains:

a magnetic metal powder; and a coating layer with which a particle surface of the magnetic metal powder is coated, in which when the magnetic bead is left to stand in a state of a dispersion obtained by dispersing the magnetic bead in water, a time until an initial absorbance of the dispersion attenuates to 80% of an absorbance when the standing is started is 90 seconds or longer.

A magnetic bead dispersion according to an application example of the present disclosure contains:

the magnetic bead according to the application example of the present disclosure; and a dispersion medium in which the magnetic bead is dispersed.

DESCRIPTION OF EXEMPLARY EMBODIMENTS

Hereinafter, preferred embodiments of a magnetic bead and a magnetic bead dispersion according to the present disclosure will be described in detail with reference to the accompanying drawings.

The magnetic beads according to the embodiment are a particle group that adsorbs a biological substance and is used for magnetic separation in this state. The magnetic separation is a technique of applying an external magnetic field to a container in which a solid phase containing magnetic beads and a liquid phase containing a dispersion medium are charged and magnetically attracting the solid phase so as to separate the solid phase and the liquid phase from each other.

Examples of the biological substance include substances such as nucleic acids (such as DNA and RNA), proteins, saccharides, various cells (such as cancer cells), peptides, bacteria, and viruses. The nucleic acid may exist in a state of being contained in, for example, a biological sample such as a cell or a biological tissue, a virus, or a bacterium. When such a biological substance is extracted through, for example, steps of dissolution/adsorption, washing, and elution, the biological substance can be purified and extracted by using the above-described magnetic separation.

1. Biological Substance Extraction Method

Hereinafter, an example of a biological substance extraction method using magnetic separation will be described. In the following description, a case where the biological substance is a nucleic acid will be described as an example.

Figure 1:
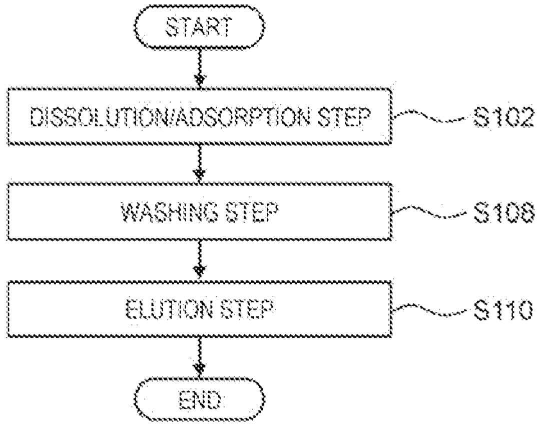
FIG. 1 is a step diagram showing an example of a biological substance extraction method.

FIG. 1 is a step diagram showing an example of the biological substance extraction method. FIGS. 2 to 5 are schematic diagrams showing the biological substance extraction method shown in FIG. 1.

The biological substance extraction method shown in FIG. 1 includes a dissolution/adsorption step S102, a washing step S108, and an elution step S110. Hereinafter, each step will be sequentially described.

1.1. Dissolution/Adsorption Step

Figure 2:
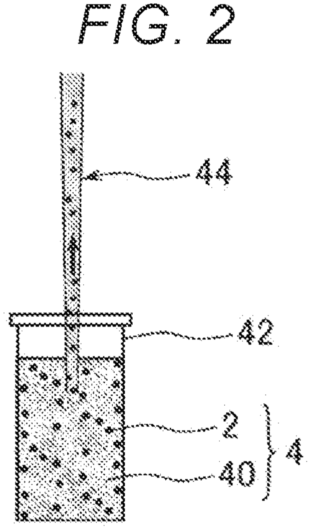
FIG. 2 is a schematic diagram showing the biological substance extraction method shown in FIG. 1.

In the dissolution/adsorption step S102, first, as shown in FIG. 2, a magnetic bead dispersion 4 containing magnetic beads 2 and a dispersion medium 40 is prepared in advance in a container 42.

In the container 42, the magnetic bead dispersion 4 is sufficiently stirred. Accordingly, the magnetic beads 2 are uniformly dispersed in the magnetic bead dispersion 4. Thereafter, a predetermined amount of the magnetic bead dispersion 4 is collected from the container 42 by a pipette 44 or the like.

Figure 3:
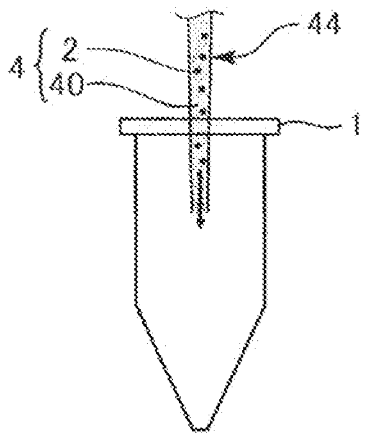
FIG. 3 is a schematic diagram showing the biological substance extraction method shown in FIG. 1.

Next, a specimen sample containing a nucleic acid, a dissolution and adsorption liquid, and the magnetic bead dispersion 4 containing the magnetic beads 2 are charged in a container 1 shown in FIG. 3. As for the magnetic bead dispersion 4, a desired amount of the magnetic bead dispersion 4 is dispensed by the pipette 44 or the like. When a concentration distribution of the magnetic bead dispersion 4 is uniform, a desired amount of the magnetic beads 2 is added to the container 1 by this dispensing operation.

Next, the materials contained in the container 1 are mixed. Accordingly, the magnetic beads 2 are dispersed again in a liquid 3 in the container 1. Since the nucleic acid is usually encapsulated in a cell membrane or a nucleus, a so-called outer shell of the cell membrane or the nucleus is first dissolved and removed by a dissolution action of the dissolution and adsorption solution, and the nucleic acid is extracted. Thereafter, the nucleic acid is adsorbed by the magnetic beads 2 due to an adsorption action of the dissolution and adsorption liquid.

As the dissolution and adsorption liquid, for example, a liquid containing a chaotropic substance is used. The chaotropic substance acts to generate chaotropic ions in an aqueous solution and reduce interaction of water molecules, thereby destabilizing a structure, and contributes to the adsorption of the nucleic acid to the magnetic beads 2.

1.1.1. Magnetic Separation Operation

Figure 4:
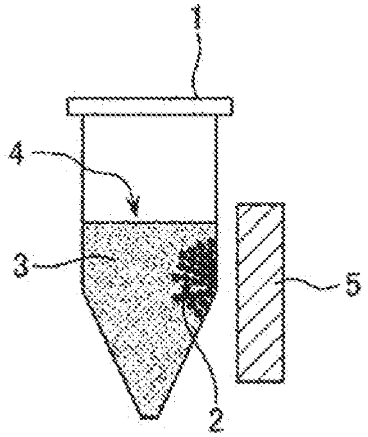
FIG. 4 is a schematic diagram showing the biological substance extraction method shown in FIG. 1.

In the dissolution/adsorption step S102, an external magnetic field is applied to the magnetic beads 2 to which the nucleic acid is adsorbed, and the magnetic beads 2 are magnetically attracted. Accordingly, the magnetic beads 2 are moved and fixed to an inner wall of the container 1. As a result, as shown in FIG. 4, the magnetic beads 2 that are in a solid phase and the liquid 3 that is in a liquid phase can be separated from each other. In the present specification, an operation of fixing the magnetic beads 2 by applying such an external magnetic field is referred to as a "magnetic separation operation".

Before the magnetic separation operation is performed, the materials contained in the container 1 are stirred as necessary. Accordingly, a probability that the nucleic acid is adsorbed to the magnetic beads 2 is increased. For example, a vortex mixer, hand shaking or pipetting is used to perform the stirring.

For example, a magnet 5 disposed beside the container is used to apply the external magnetic field. The magnet 5 may be an electromagnet or a permanent magnet. When the external magnetic field acts on the magnetic beads 2, the magnetic beads 2 move toward the magnet 5.

After the magnetic separation operation is performed, acceleration may be applied to the container as necessary. Accordingly, the liquid 3 adhering to the magnetic beads 2 can be shaken off, so that the liquid 3 that is not separated can be reduced. The acceleration may be centrifugal acceleration. A centrifuge may be used to apply the centrifugal acceleration.

1.1.2. Liquid Discharge Operation

Figure 5:
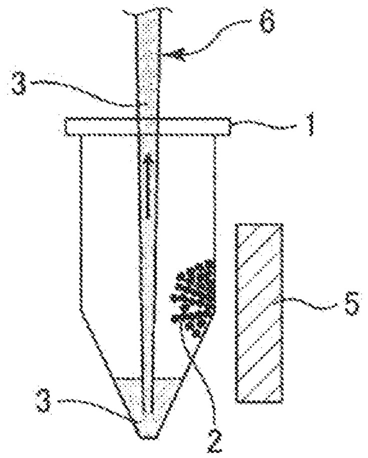
FIG. 5 is a schematic diagram showing the biological substance extraction method shown in FIG. 1.

In the dissolution/adsorption step S102, in a state in which the magnetic beads 2 are fixed to the inner wall of the container 1, as shown in FIG. 5, the liquid 3 accumulated on a bottom of the container 1 is suctioned and discharged by, for example, a pipette 6. In the present specification, such an operation of discharging the liquid 3 is referred to as a "liquid discharge operation".

1.2. Washing Step

In the washing step S108, the magnetic beads 2 to which the nucleic acid is adsorbed are washed. Washing refers to an operation of removing impurities by bringing the magnetic beads 2 to which the nucleic acid is adsorbed into contact with a washing liquid and then separating the magnetic beads 2 again in order to remove the impurities adsorbed on the magnetic beads 2.

Specifically, after the washing liquid is charged in the container 1 in which the magnetic beads 2 to which the nucleic acid is adsorbed are charged, the magnetic separation operation and the liquid discharge operation described above are performed again.

Among these operations, in the magnetic separation operation, first, the washing liquid is supplied into the container 1 by a pipette or the like. Then, the magnetic beads 2 and the washing liquid are stirred. Accordingly, the washing liquid is in contact with the magnetic beads 2, and the magnetic beads 2 to which the nucleic acid is adsorbed are washed. For example, a vortex mixer, hand shaking or pipetting is used to perform the stirring. In addition, at this time, the application of the external magnetic field may be temporarily turned off. Accordingly, the magnetic beads 2 are dispersed in the washing liquid, so that washing efficiency can be further improved.

Next, as the liquid discharge operation, the washing liquid accumulated on the bottom of the container 1 is discharged in a state in which the magnetic beads 2 are fixed to the inner wall of the container 1. The magnetic beads 2 are washed by performing the supply and discharge of the washing liquid as described above at least once. Accordingly, impurities excluding the nucleic acid can be removed with high accuracy.

The washing liquid is not particularly limited as long as the washing liquid is a liquid that does not promote elution of the nucleic acid and does not promote binding of impurities to the magnetic beads 2, and examples thereof include organic solvents such as ethanol, isopropyl alcohol, and acetone, and aqueous solutions and low salt concentration aqueous solutions of these organic solvents.

The washing liquid may contain a surfactant such as Triton (registered trademark), Tween (registered trademark), or SDS. In addition, the washing liquid may contain a chaotropic substance such as guanidine hydrochloride.

In addition, the washing step S108 may be performed as necessary, and may be omitted when washing is not necessary.

1.3. Elution Step

In the elution step S110, the nucleic acid adsorbed on the magnetic beads 2 is eluted into an eluent. Elution is an operation of transferring the nucleic acid to the eluent by bringing the magnetic beads 2 to which the nucleic acid is adsorbed into contact with the eluent and then separating the magnetic beads 2 again.

Specifically, after the eluent is charged in the container 1 in which the magnetic beads 2 to which the nucleic acid is adsorbed are charged, the magnetic separation operation and the liquid discharge operation described above are performed again.

Among these operations, in the magnetic separation operation, first, the eluent is supplied into the container 1 by a pipette or the like. Then, the magnetic beads 2 and the eluent are stirred. Accordingly, the eluent is in contact with the magnetic beads 2, and the nucleic acid is eluted into the eluent. For example, a vortex mixer, hand shaking or pipetting is used to perform the stirring. In addition, at this time, the application of the external magnetic field may be temporarily turned off. Accordingly, the magnetic beads 2 are dispersed in the eluent, so that elution efficiency can be further improved.

Next, as the liquid discharge operation, the eluent accumulated on the bottom of the container 1 is discharged in a state in which the magnetic beads 2 are fixed to the inner wall of the container 1. Accordingly, the eluent containing the nucleic acid can be collected.

The eluent is not particularly limited as long as the eluent is a liquid that promotes the elution of the nucleic acid from the magnetic beads 2 to which the nucleic acid is adsorbed, and for example, in addition to water such as sterile water or pure water, a TE buffer, that is, an aqueous solution containing 10 mM of Tris-HCl buffer and 1 mM of EDTA and having pH of about 8 is preferably used.

The eluent may contain a surfactant such as Triton (registered trademark), Tween (registered trademark), or SDS. In addition, sodium azide may be contained as a preservative.

In addition, in the elution step S110, the eluent may be heated. Accordingly, the elution of the nucleic acid can be promoted. A heating temperature of the eluent is not particularly limited, and is preferably 70° C. or higher and 200° C. or lower, more preferably 80° C. or higher and 150° C. or lower, and still more preferably 95° C. or higher and 125° C. or lower.

2. Magnetic Bead

Next, the magnetic beads 2 according to the embodiment will be described. The magnetic beads 2 are particles that are magnetic and whose surfaces are bindable to a biological substance.

Figure 6:
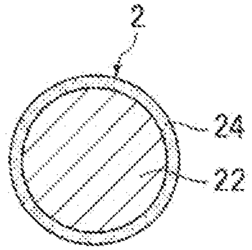
FIG. 6 is a cross-sectional view showing a magnetic bead according to an embodiment.

FIG. 6 is a cross-sectional view showing one magnetic bead 2 according to the embodiment. The magnetic bead 2 shown in FIG. 6 contains a magnetic metal powder 22 and a coating layer 24. As the magnetic metal powder 22, a metal powder having magnetic properties is used. At least a surface of the coating layer 24 is formed of a substance or a chemical structure bindable to the biological substance. In the above-described magnetic separation operation, a particle group that is an aggregate of the magnetic beads 2 is used. In the present specification, the magnetic bead 2 refers to a particle group or one particle constituting the particle group.

When the magnetic bead 2 is subjected to the above-described magnetic separation operation, the magnetic bead 2 may be added alone to the container 1, and the magnetic bead 2 is often added in the state of the magnetic bead dispersion 4 obtained by dispersing the magnetic bead 2 in water or the like. Since the magnetic bead dispersion 4 is a liquid, handling and weighing thereof are easy. In particular, when the biological substance extracted by the biological substance extraction method is quantified, an amount of the magnetic bead 2 added to the container 1 in the dissolution/adsorption step S102 affects a quantification result of the biological substance. Therefore, when a predetermined amount of the magnetic bead dispersion 4 is collected and dispensed into the container 1 containing a specimen sample, it is required to collect and dispense a desired amount of the magnetic bead 2. If the desired amount of the magnetic bead can be collected and dispensed, accuracy of the quantification result of the biological substance extracted by the biological substance extraction method described above can be improved.

When the magnetic bead 2 according to the embodiment is dispersed in water to prepare a dispersion, a change over time in absorbance of the dispersion satisfies a predetermined condition. The change over time in absorbance is referred to as a "sedimentation characteristic" when being compared with a characteristic at the time when the magnetic field is applied as will be described later. The sedimentation characteristic is evaluated as follows.

First, the magnetic bead 2 is dispersed in water to prepare a magnetic bead dispersion. Pure water is used as the water. Next, the magnetic bead dispersion is charged in a spectroscopic cell, and stirring by ultrasonic irradiation or stirring by a vortex mixer is performed. A time of the stirring is 1 minute or longer. Next, the spectroscopic cell subjected to the stirring treatment is quickly set in a cell holder of a spectrophotometer, and then left to stand. At the same time, a measurement of a change over time in absorbance of the spectroscopic cell is started. Then, a time required for an initial absorbance to attenuate to 80% of an absorbance at the start of standing is measured. The time measured in this manner serves as an index for evaluating whether the magnetic bead 2 dispersed in water maintains a good dispersion state, that is, to what extent sedimentation of the magnetic bead 2 dispersed in water is reduced. Therefore, in the present specification, this time is referred to as a "sedimentation evaluation time".

The magnetic bead 2 according to the embodiment has a sedimentation evaluation time of 90 seconds or longer. By keeping the sedimentation evaluation time within the above range, when the magnetic bead dispersion 4 is collected by the pipette 44 or the like and dispensed into the container 1, it is possible to sufficiently reduce a variation in dispensing amount of the magnetic bead 2 during collection or dispensing. That is, by using such a magnetic bead 2 in the biological substance extraction method, even if a certain time is required for an operation of collection or dispensing, a desired amount of the magnetic bead 2 can be dispensed into the container 1. Specifically, since the magnetic bead dispersion 4 in the container 42 can be maintained in a uniformly suspended state over a long period of time, the magnetic bead dispersion 4 can be collected at a constant concentration even if the collection operation using the pipette 44 takes time. In addition, since the magnetic bead dispersion 4 can also be maintained in the uniformly suspended state in the pipette 44 after the collection, a desired amount of the magnetic bead 2 can be dispensed into the container 1 when dispensing into the container 1. Accordingly, it is possible to reduce a variation in extraction amount of the biological substance. As a result, accuracy of quantitative analysis of the biological substance can be improved.

In addition, the sedimentation evaluation time is preferably 180 seconds or longer. When the sedimentation evaluation time is shorter than the lower limit value of 90 seconds, the variation in dispensing amount of the magnetic bead 2 is large when it takes time to perform the collection and dispensing operations. As a result, accuracy of a result of the quantitative analysis of the biological substance decreases. A concentration of the magnetic bead in the magnetic bead dispersion is 0.1% by mass, and a temperature is 25° C.±5° C.

On the other hand, when an external magnetic field acts on the magnetic bead 2 according to the embodiment, the magnetic bead 2 is required to be rapidly attracted so as to complete the magnetic separation. Accordingly, a time required for the magnetic separation operation can be shortened, so that it is possible to speed up the entire testing of the biological substance.

The magnetic bead 2 according to the present embodiment is dispersed in water to prepare a dispersion, and the change over time in absorbance of the dispersion satisfies a predetermined condition when an external magnetic field is applied. This change over time in absorbance is referred to as a "magnetic separation characteristic". The magnetic separation characteristic is evaluated as follows.

First, the magnetic bead 2 is dispersed in water to prepare a magnetic bead dispersion. Pure water is used as the water. Next, the magnetic bead dispersion is charged in a spectroscopic cell, and stirring by ultrasonic irradiation or stirring by a vortex mixer is performed. A time of the stirring is 1 minute or longer. Next, the spectroscopic cell subjected to the stirring treatment is quickly set in a cell holder of a spectrophotometer. A magnet is attached to the cell holder in advance according to a position where the spectroscopic cell is disposed. Accordingly, by setting the spectroscopic cell in the cell holder, an external magnetic field is applied to the spectroscopic cell. When the spectroscopic cell is set, a shortest distance between an inner wall of the spectroscopic cell and the magnet is 2.0 mm. In addition, as the magnet, a magnet having a surface magnetic flux density of 180 mT is used. Then, a measurement of a change over time in absorbance of the spectroscopic cell is started at the same time when the standing of the spectroscopic cell is started. Then, a time until an initial absorbance attenuates to 10% of an absorbance at the time when the spectroscopic cell is set in the cell holder is measured. The time measured in this manner serves as an index for evaluating a magnetic separation rate of the magnetic bead 2 dispersed in water. Therefore, in the present specification, this time is referred to as a "magnetic separation evaluation time".

The magnetic separation evaluation time of the magnetic bead 2 according to the embodiment is preferably shorter than 60 seconds, and more preferably shorter than 40 seconds. By keeping the magnetic separation evaluation time within the above range, the time required for the magnetic separation operation can be sufficiently shortened. That is, the magnetic separation rate of the magnetic bead 2 to which the biological substance is adsorbed can be increased. Accordingly, it is possible to speed up the entire testing of the biological substance. A concentration of the magnetic bead in the magnetic bead dispersion is 0.1% by mass, and a temperature is 25° C.±5° C.

As the spectrophotometer, for example, U-3900H manufactured by Hitachi High-Tech Science Corporation is used. In addition, a measurement wavelength of the absorbance is 550 nm. As the spectroscopic cell, for example, a standard type ST-MA ASLAB disposable cell having a size of 12.5×12.5×45 mm is used.

Therefore, the magnetic bead 2 preferably has a sedimentation evaluation time of 90 seconds or longer and a magnetic separation evaluation time shorter than 60 seconds. Accordingly, the magnetic bead 2 is excellent in both sedimentation and magnetic separation.

Figure 7:
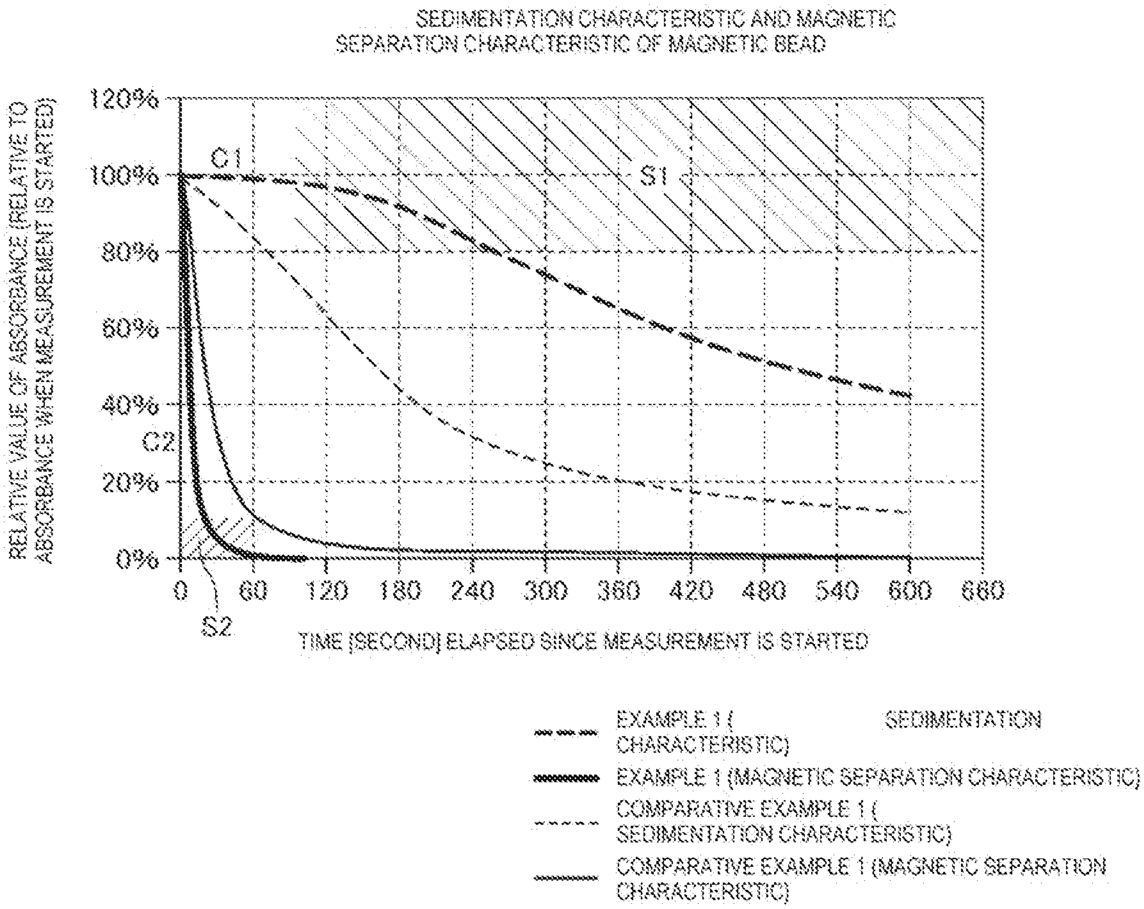
FIG. 7 is a graph showing a sedimentation characteristic and a magnetic separation characteristic obtained for a magnetic bead dispersion containing the magnetic bead according to the embodiment.

FIG. 7 is a graph showing a sedimentation characteristic and a magnetic separation characteristic obtained for a magnetic bead dispersion containing the magnetic bead 2 according to the embodiment. A horizontal axis represents an elapsed time since a measurement is started, and a vertical axis represents a relative value of a measured absorbance when an absorbance at the time when the measurement is started is set as 100%. In FIG. 7, "Example 1" corresponds to a sedimentation characteristic and a magnetic separation characteristic obtained for the magnetic bead dispersion containing the magnetic bead 2 according to the embodiment. In addition, in FIG. 7, a sedimentation characteristic and a magnetic separation characteristic obtained for a magnetic bead not according to the embodiment are shown as "Comparative Example 1".

In FIG. 7, a range S1 the sedimentation evaluation time is to be within and a range S2 the magnetic separation evaluation time is to be within are shown.

As shown in FIG. 7, the sedimentation characteristic of the magnetic bead 2 passes through the range S1 the sedimentation evaluation time is to be within. In addition, the magnetic separation characteristic of the magnetic bead 2 passes through the range S2 the magnetic separation evaluation time is to be within. On the other hand, the characteristic of the magnetic bead not according to the embodiment does not pass through the ranges S1 and S2.

In addition, as shown in FIG. 7, when a curve representing the sedimentation characteristic is denoted by C1 and a curve representing the magnetic separation characteristic is denoted by C2, it can be said that the magnetic bead becomes more suitable for the magnetic separation operation as a distance between the curve C1 and the curve C2 in the vertical axis direction increases.

A residual absorbance after 60 seconds since the measurement of the sedimentation characteristic is started is denoted by A1, and a residual absorbance after 60 seconds since the measurement of the magnetic separation characteristic is started is denoted by A2. A ratio A1/A2 of the residual absorbance A1 to the residual absorbance A2 is an index indicating suitability for the magnetic separation operation, and an evaluation of the suitability for the magnetic separation operation becomes higher as this ratio increases.

The ratio A1/A2 of the magnetic bead 2 according to the embodiment is preferably 8.5 or more, more preferably 15 or more, and still more preferably 25 or more. Since such a magnetic bead 2 has a sufficiently long sedimentation evaluation time and a sufficiently short magnetic separation evaluation time, it is possible to minimize the variation in dispensing amount of the magnetic bead 2 when dispensing into the container 1 and to shorten the time required for the magnetic separation operation. Therefore, when the ratio A1/A2 of the magnetic bead 2 is within the above range, the suitability for the magnetic separation operation can be particularly improved.

Saturation magnetization of the magnetic bead 2 is preferably 50 emu/g or more, and more preferably 100 emu/g or more. The saturation magnetization is a value of magnetization in a case where magnetization exhibited by a magnetic material when a sufficiently large magnetic field is applied from outside is constant regardless of the magnetic field. As the saturation magnetization of the magnetic bead 2 becomes higher, a function thereof as a magnetic material can be exhibited more sufficiently. Specifically, since a moving speed of the magnetic bead 2 in a magnetic field can be increased, a time required for the magnetic separation can be shortened. In addition, the saturation magnetization of the magnetic bead 2 affects an adsorption force when the magnetic bead 2 is fixed by the external magnetic field. When the saturation magnetization is within the above range, a sufficiently high adsorption force can be obtained, and therefore, when the liquid 3 is discharged in a state in which the magnetic bead 2 is fixed, discharge of the magnetic bead 2 together with the liquid 3 can be prevented. Accordingly, it is possible to prevent a decrease in yield of the nucleic acid caused by a decrease in amount of the magnetic bead 2.

An upper limit value of the saturation magnetization of the magnetic bead 2 is not particularly limited, and is preferably 220 emu/g or less from the viewpoint of ease of material selection suitable for balancing performance and cost.

The saturation magnetization of the magnetic bead 2 can be measured by a vibrating sample magnetometer (VSM) or the like. Examples of the vibrating sample magnetometer include TM-VSM1230-MHHL manufactured by TAMAKAWA CO., LTD. A maximum applied magnetic field at the time of measuring the saturation magnetization is, for example, 0.5 T or more.

In addition, an average particle size D50 of the magnetic bead 2 is preferably 0.5 μm or more and 50 μm or less, more preferably 1 μm or more and 30 μm or less, and still more preferably 2 μm or more and 20 μm or less. When the average particle size D50 of the magnetic bead 2 is within the above range, a specific surface area of the magnetic bead 2 can be sufficiently large, and thus an attractive force and an adsorption force suitable for magnetic separation can be generated in the magnetic bead 2. In addition, aggregation of the magnetic beads 2 can be reduced, and thus dispersibility can be improved. When the average particle size D50 of the magnetic bead 2 is less than the lower limit value, a value of magnetization of the magnetic bead 2 is small, the magnetic beads 2 are likely to aggregate, and, as a result, extraction efficiency of the nucleic acid may decrease. In addition, the moving speed of the magnetic bead 2 may decrease, and the time required for magnetic separation may increase. On the other hand, when the average particle size D50 of the magnetic bead 2 exceeds the upper limit value, the specific surface area of the magnetic bead 2 is small, so that a sufficient amount of the nucleic acid cannot be adsorbed, and thus an amount of the extracted nucleic acid may decrease. In addition, the magnetic bead 2 may easily settle, the amount of the magnetic bead 2 that can contribute to the extraction of the nucleic acid may decrease, and thus the extraction efficiency of the nucleic acid may decrease.

A volume-based particle size distribution may be measured by a laser diffraction/dispersion method, and the average particle size D50 of the magnetic bead 2 can be obtained based on an integrated distribution curve obtained based on the particle size distribution. Specifically, in the integrated distribution curve, a particle size (median diameter) at which a cumulative value is 50% from a small diameter side is the average particle size D50 of the magnetic bead 2. Examples of a device for measuring the particle size distribution by the laser diffraction/dispersion method include MT3300 series manufactured by MicrotracBEL Corporation. The method is not limited to the laser diffraction/dispersion method, and a method such as image analysis may be used.

In addition, a 90% particle size of the magnetic bead 2 is referred to as D90. In the magnetic bead 2, a ratio D90/D50 of the 90% particle size D90 to the average particle size D50 is preferably 3.00 or less, more preferably 2.00 or less, and still more preferably 1.75 or less. Accordingly, since a content of coarse particles is low, it is possible to prevent the coarse particles from attracting and aggregating relatively small surrounding particles and thus forming aggregates. When aggregates are generated, the aggregates settle due to own weight, and the extraction efficiency may decrease and a testing time of the biological substance may increase accordingly. Therefore, when the ratio D90/D50 is within the above range, occurrence of these problems can be prevented. When the ratio D90/D50 exceeds the upper limit value, the content of coarse particles is high, and therefore, even when the application of the external magnetic field is turned off, the dispersibility of the magnetic bead 2 may decrease, and aggregation may easily occur.

The volume-based particle size distribution may be measured by the laser diffraction/dispersion method, and the 90% particle size D90 of the magnetic bead 2 can be obtained based on the integrated distribution curve obtained based on the particle size distribution. Specifically, in the integrated distribution curve, a particle size at which a cumulative value is 90% from the small diameter side is the 90% particle size D90 of the magnetic bead 2. Examples of a device for measuring the particle size distribution by the laser diffraction/dispersion method include MT3300 series manufactured by MicrotracBEL Corporation. The method is not limited to the laser diffraction/dispersion method, and a method such as image analysis may be used.

In addition, when an average thickness of the coating layer 24 is t and the average particle size of the magnetic bead 2 is D50, a ratio t/D50 of t to D50 is preferably 0.0001 or more and 0.05 or less, and more preferably 0.001 or more and 0.01 or less. When the t/D50 is less than the lower limit value, a ratio of a thickness of the coating layer 24 to a size of the magnetic metal powder 22 is excessively small, so that the coating layer 24 may be broken or peeled off when the magnetic beads 2 collide with each other or the magnetic bead 2 collides with the inner wall of the container 1 or the like. Therefore, the amount of the extracted nucleic acid adsorbed on the surface of the coating layer 24 may decrease, and thus the extraction efficiency may decrease. In addition, fragments of the peeled coating layer 24 and the magnetic metal powder 22 are present in the dispersion, and may be mixed as impurities (contamination) at the same time when the nucleic acid is extracted. Further, the magnetic metal powder 22 is exposed due to breaking and peeling of the coating layer 24, and elution of iron ions or the like occurs in a case where the magnetic metal powder 22 is brought into contact with an acidic solution or the like, and, as a result, the extraction efficiency of the nucleic acid may decrease. On the other hand, when the t/D50 exceeds the upper limit value, a volume ratio of the coating layer 24 to the entire volume of the magnetic bead 2 is large, and thus magnetization per volume of the magnetic bead 2 may decrease. Accordingly, the moving speed of the magnetic bead 2 when the external magnetic field acts thereon decreases, and the time required for magnetic separation may increase.

The thickness of the coating layer 24 can be measured, for example, based on a cross-sectional observation image of the magnetic bead 2 observed with a transmission electron microscope or a scanning electron microscope. In addition, the average thickness t of the coating layer 24 can be calculated by acquiring a plurality of observation images and averaging measured values based on image processing or the like. For example, the average thickness t is a value obtained by measuring the thickness of the coating layer 24 at five or more locations on one magnetic bead 2, obtaining an average value of the thickness, and then averaging the average values of ten or more magnetic beads 2.

In addition, a coercive force Hc of the magnetic bead 2 is preferably 1500 A/m or less, more preferably 800 A/m or less, and still more preferably 200 A/m or less. The coercive force Hc refers to a value of an external magnetic field in an opposite direction required to return a magnetized magnetic material to an unmagnetized state. That is, the coercive force Hc means a resistance force against an external magnetic field. As the coercive force Hc of the magnetic bead 2 becomes smaller, the magnetic beads 2 are less likely to aggregate even when a state thereof is switched from a state in which the magnetic field is applied to a state in which the magnetic field is not applied, and thus the magnetic bead 2 can be uniformly dispersed in the dispersion. Further, even when the switching of the magnetic field application is repeated, as the coercive force Hc becomes smaller, redispersibility of the magnetic bead 2 is more excellent, so that aggregation of the magnetic beads 2 can be further reduced. A lower limit value of the coercive force Hc of the magnetic bead 2 is not particularly limited, and is preferably 1 A/m or more from the viewpoint of ease of material selection suitable for balancing performance and cost.

The coercive force Hc of the magnetic bead can be measured by a vibrating sample magnetometer or the like in the same manner as the saturation magnetization described above. A maximum applied magnetic field at the time of measuring the coercive force Hc is, for example, 15 kOe.

In addition, a relative permeability of the magnetic bead 2 is preferably 5 or more. When the relative permeability of the magnetic bead 2 is less than the lower limit value, the moving speed of the magnetic bead 2 may decrease, and the time required for magnetic separation may increase. The upper limit value of the relative permeability of the magnetic bead 2 is not particularly limited, and a value of the relative permeability is often substantially 100 or less due to an influence of an antimagnetic field since the magnetic bead 2 is in a powder form.

2.1. Magnetic Metal Powder

The magnetic metal powder 22 is a metal particle having magnetism, and preferably contains at least one of Fe, Co, and Ni as a constituent element. Since a metal particle has saturation magnetization higher than that of an oxide-based particle such as ferrite, the time required for magnetic separation of the magnetic bead 2 can be shortened. In particular, from the viewpoint of obtaining high saturation magnetization, a composition of the magnetic metal powder 22 is preferably an alloy containing Fe as a main component (Fe-based alloy). Specifically, an atomic ratio of Fe is more preferably 50% or more, and still more preferably 70% or more. In addition, the composition of the magnetic metal powder 22 may be an alloy containing Fe as the main component (Fe-based alloy), and examples thereof include a Fe—Co-based alloy, a Fe—Ni-based alloy, a Fe—Co—Ni-based alloy, and a compound containing Fe, Co, and Ni. Further, from the viewpoint of obtaining high magnetization, a carbonyl iron powder containing substantially 100% by mass of Fe, a Fe—Si-based alloy powder, a Fe—Si—Cr-based alloy powder, or the like is preferably used as the magnetic metal powder 22. Such a Fe-based alloy can implement the magnetic metal powder 22 having high saturation magnetization and high magnetic permeability even when a particle size is small. Accordingly, it is possible to implement the magnetic bead 2 having a high moving speed due to the action of the external magnetic field and having a large magnetic attractive force when captured by the external magnetic field. As a result, the time required for magnetic separation can be shortened, and the magnetic bead 2 can be prevented from being mixed into the eluent and becoming impurities.

The Fe-based alloy can contain one or two or more elements selected from the group consisting of Cr, Nb, Cu, Al, Mn, Mo, Si, Sn, B, C, P, Ti, and Zr, depending on desired characteristics, in addition to elements exhibiting ferromagnetism alone, such as Co or Ni described above. Si is a main constituent element in the alloy powder, and is also an element that promotes amorphization.

The Fe-based alloy may contain impurities as long as the effects of the magnetic metal powder 22 are not impaired. The impurities in the embodiment are elements that are unintentionally mixed in the raw material of the magnetic metal powder 22 or mixed at the time of producing the magnetic bead 2. The impurities are not particularly limited, and examples thereof include O, N, S, Na, Mg, and K.

An example of the Fe-based alloy is an alloy in which a content of S1 is preferably 1.0 atom % or more and 30.0 atom % or less, more preferably 1.5 atom % or more and 13.0 atom % or less, and still more preferably 2.0 atom % or more and 7.0 atom % or less. Since such an alloy has high magnetic permeability, saturation magnetization tends to be high.

In addition, the Fe-based alloy may contain at least one of B (boron) having a content of 5.0 atom % or more and 16.0 atom % or less and C (carbon) having a content of 0.5 atom % or more and 5.0 atom % or less. These elements promote amorphization, and contribute to formation of a stable amorphous structure or nanocrystal structure in the magnetic metal powder 22.

Further, the Fe-based alloy preferably contains Cr (chromium) having a content of 1.0 atom % or more and 8.0 atom % or less. Accordingly, corrosion resistance of the magnetic metal powder 22 can be improved.

A total content of impurities is preferably 1.0 atom % or less. At this level, even if the impurities are contained, the effects of the magnetic metal powder 22 are not impaired.

An example of a particularly preferable Fe-based alloy is an alloy containing Fe as a main component and having a S1 content of 2.0% by mass or more and 9.0% by mass or less, a B content of 1.0% by mass or more and 5.0% by mass or less, and a Cr content of 1.0% by mass or more and 3.0% by mass or less. Since such a Fe-based alloy contains a stable amorphous structure, a coercive force thereof is low, and, since the Fe content is high, saturation magnetization is high. In addition, since corrosion resistance is improved by containing Cr, elution of iron ions can be reduced. Iron ions may adversely affect the testing of the biological substance, and thus it is preferable that elution is reduced.

The constituent elements and composition of the magnetic metal powder 22 can be identified by an ICP emission spectrometric method defined in JIS G 1258:2014, a spark emission spectrometric method defined in JIS G 1253:2002, or the like. In addition, when the magnetic metal powder 22 is coated with the coating layer 24, the constituent elements and composition can be measured by the above method after the coating layer 24 is removed by a chemical or physical method. In addition, when it is difficult to remove the coating layer 24, for example, after the magnetic bead 2 is cut, a portion of the magnetic metal powder 22 as a core can be analyzed by an analysis device such as an electron probe micro analyzer (EPMA) or energy dispersive X-ray spectroscopy (EDX).

A Vickers hardness of the magnetic metal powder 22 is preferably 100 or more, more preferably 300 or more, and still more preferably 800 or more. A method for measuring the hardness of the magnetic metal powder 22 is, for example, as follows. A plurality of particles of the magnetic metal powder 22 are taken out and embedded in a resin to prepare a resin-embedded sample, and then a cross section of the magnetic metal powder 22 is caused to appear on a surface of the resin-embedded sample by grinding and polishing. An indentation is made on the resin-embedded sample by using a micro Vickers tester, a nanoindenter, or the like, and the hardness is measured based on a size of the indentation.

When the Vickers hardness of the magnetic metal powder 22 is less than the lower limit value, the magnetic metal powder 22 may be plastically deformed due to an impact when the magnetic beads 2 collide with each other. When the plastic deformation occurs, the coating layer 24 may peel off or fall off. The upper limit of the Vickers hardness is not particularly limited, and is preferably 3000 or less from the viewpoint of ease of material selection suitable for balancing performance and cost.

A main metal structure constituting the magnetic metal powder 22 can take various forms such as a crystal structure, an amorphous structure, and a nanocrystal structure. The amorphous structure is an amorphous structure in which no crystal is present, and the nanocrystal refers to a structure mainly composed of a fine crystal whose particle size is 100 nm or less. The magnetic metal powder 22 preferably contains an amorphous structure or a nanocrystal structure in particular. The amorphous structure and the nanocrystal structure impart high hardness to the magnetic metal powder 22. In addition, the amorphous structure or the nanocrystal structure results in a particularly low coercive force Hc of the magnetic bead 2, which contributes to improvement of the redispersibility of the magnetic bead 2. A volume fraction of the amorphous structure or the nanocrystal structure in the magnetic metal powder 22 is preferably 40% or more, and more preferably 60% or more. The volume fraction is determined based on a result of crystal structure analysis by X-ray diffraction. In addition, each of the crystal structure, the amorphous structure, and the nanocrystal structure may be present alone, or two or more thereof are mixed to form a structure.

The metal structure of the magnetic metal powder 22 can be identified by subjecting the magnetic metal powder 22 to crystal structure analysis by an X-ray diffraction method. Further, the metal structure can be identified by analyzing a structure observation image or a diffraction pattern of a cut-out sample with a transmission electron microscope (TEM). More specifically, in the case of the amorphous structure, for example, a diffraction peak derived from a metal crystal such as an $\alpha$-Fe phase is not observed in peak analysis in the X-ray diffraction method. In addition, in the case of the amorphous structure, a so-called halo pattern is formed in an electron beam diffraction pattern obtained by a TEM, and formation of a spot by a crystal is not observed. The nanocrystal structure is formed of a crystal structure having a particle size of, for example, 100 nm or less, and can be determined based on a TEM observation image. More precisely, an average particle size can be calculated by image processing or the like based on a plurality of TEM structure observation images in which a plurality of crystals are present. In addition, a particle size of a crystal grain can be estimated by a Sherer method based on a diffraction peak of a crystal phase to be analyzed by the X-ray diffraction method. Further, for a crystal structure having a large particle size, a particle size of a crystal grain can be measured by a method such as observation of a cross section with an optical microscope or a scanning electron microscope (SEM).

In order to obtain the amorphous structure and the nanocrystal structure, it is effective to increase a cooling rate when a molten raw material is pulverized and then cooled when producing the magnetic metal powder 22. In addition, ease of formation of the amorphous structure and the nanocrystal structure also depends on the composition of the alloy. As a specific alloy system suitable for forming the amorphous structure and the nanocrystal structure, a composition in which one or two or more selected from the group consisting of Cr, Si, B, C, P, Nb, and Cu are added to Fe is preferable.

The magnetic metal powder 22 is produced by a method according to a general metal powder production method. Examples of the production method include a melting process in which a metal is melted and solidified to form a powder, a chemical process in which a powder is produced by a reduction or carbonylation method, and a mechanical process in which a larger-shaped product such as an ingot is mechanically pulverized to obtain a powder. Among these, the magnetic metal powder 22 is suitably produced by the melting process.

Among production methods based on the melting process, an atomization method is exemplified as a representative production method. That is, the magnetic metal powder 22 is preferably an atomized powder. In this method, a molten metal having a desired composition formed by melting is sprayed so as to form a powder.

The atomization method is a method in which a molten metal is rapidly solidified by colliding with a fluid (liquid or gas) injected at a high speed so as to form a powder. The atomization method is divided into a water atomization method, a high-pressure water atomization method, a rotary water atomization method, a gas atomization method, and the like depending on a type of a cooling medium or a difference in device configurations. According to the atomization method, the magnetic metal powder 22 can be efficiently produced. Further, in the high-pressure water atomization method, the rotary water atomization method, and the gas atomization method, a particle shape of the metal powder is close to a spherical shape due to an action of surface tension. Among these, in the high-pressure water atomization method or the high-speed rotary water atomization method, fine molten metal droplets are formed, and thereafter, the molten metal droplets are rapidly cooled and solidified by a high-speed water flow such that a rapidly cooled powder close to a spherical shape and having a fine particle size can be obtained. In these production methods, since the molten metal can be cooled at an extremely high cooling rate of about 103° C./sec to 107° C./sec, it is possible to solidify the molten metal in a state in which disordered atomic arrangement in the molten metal is highly maintained. Therefore, a powder containing an amorphous structure can be efficiently produced. In addition, by appropriately heat-treating the amorphous powder obtained in this manner, a powder containing a nanocrystal structure can be obtained.

2.2. Coating Layer

As shown in FIG. 6, a particle surface of the magnetic metal powder 22 is coated with the coating layer 24. The coating layer 24 may be formed on at least a part of the particle surface of the magnetic metal powder 22, and preferably covers the entire particle surface.

A main function of the coating layer 24 is to adsorb the biological substance. From this viewpoint, the coating layer 24 preferably contains the following substance or chemical structure on the surface thereof.

A first preferable substance constituting the coating layer 24 is an oxide such as a silicon oxide. The silicon oxide is a substance particularly suitable for nucleic acid extraction, and a composition formula thereof is preferably, for example, $SiO_x$ ($0<x\leq 2$), and specifically $SiO_2$ is preferable. The silicon oxide enables extraction and collection of the nucleic acid by specifically adsorbing the nucleic acid in an aqueous solution containing a chaotropic substance. In addition to the silicon oxide, examples of the oxide include a composite oxide or a composite containing silicon and one or two or more selected from the group consisting of Al, Ti, V, Nb, Cr, Mn, Sn, and Zr.

A second preferable substance constituting the coating layer 24 is a substance containing a functional group on the surface of the coating layer in order to improve binding to the biological substance. Examples of the functional group that improves binding include, depending on a target substance, an OH group, a COOH group, a $NH_2$ group, an epoxy group, a trimethylsilyl group, and a NHS group.

Other examples of preferable substances constituting the coating layer 24 include proteins such as streptavidin, Protein A, and Protein G, and carbon. In addition, when a nucleic acid is to be extracted, examples of preferable substances include a nucleic acid having a property complementary to the target nucleic acid, specifically, an oligo (dT) primer cDNA. Further, in the case of cell separation or exosome separation, examples of preferable substances include antibodies such as CD3, CD4, CD8, CD9, CD63, and CD81.

It is desirable that the coating layer 24 does not capture any substance that is not the extraction target, such as impurities. From this viewpoint, the coating layer 24 preferably contains a substance called a blocking substance together with the above-described preferable substances of the coating layer 24. Examples of the blocking substance include polyethylene glycol, albumin, and dextrin.

The coating layer 24 may contain a substance (impurities) other than the oxide, within a range in which the effects are not impaired, for example, in a ratio of 50% by mass or less relative to the oxide described above. For example, when a silicon oxide is used as the oxide, examples of the impurities include C, N, and P.

A composition of the oxide can be determined by, for example, EDX analysis or Auger electron spectroscopy measurement.

A structure of the coating layer 24 may be any one of a single layer composed of a single substance, a single layer composed of a plurality of substances, composites, or mixtures, or a structure formed of a plurality of layers having different compositions in a depth direction of the magnetic bead 2. In addition, the surface of the coating layer 24 may be formed of a single substance or a plurality of substances.

The average thickness t of the coating layer 24 is preferably 1 nm or more and 200 nm or less, more preferably 2 nm or more and 100 nm or less, and still more preferably 3 nm or more and 50 nm or less. Accordingly, even when the magnetic beads 2 collide with each other or collide with the inner wall of the container or the like, the coating layer 24 can be prevented from being broken or peeled off. As a result, it is possible to prevent a decrease in extraction efficiency of the biological substance and generation of impurities when the biological substance is taken out. In addition, it is possible to reduce elution of iron ions and the like due to exposure of the magnetic metal powder 22. Further, it is possible to prevent a decrease in magnetization per volume of the magnetic bead 2 and to prevent a decrease in the moving speed of the magnetic bead 2.

Examples of a method for forming such a coating layer 24 include a wet forming method such as a sol-gel method and a dry forming method such as a vapor phase film forming method. Among these, the Stober method that is one of a sol-gel method or an atomic layer deposition (ALD) method can be mainly used. The Stober method is a method of forming a monodisperse particle by hydrolysis of a metal alkoxide. When the coating layer 24 is formed of a silicon oxide, the coating layer 24 can be formed by a hydrolysis reaction of a silicon alkoxide.

2.3. Effects of Magnetic Bead According to Embodiment

As described above, the magnetic bead 2 according to the embodiment contains the magnetic metal powder 22 and the coating layer 24 with which the particle surface of the magnetic metal powder 22 is coated. When the magnetic bead 2 is left to stand in a state of a dispersion obtained by dispersing the magnetic bead 2 in water, a time until an initial absorbance of the dispersion attenuates to 80% of an absorbance when the standing is started is 90 seconds or longer.

According to such a configuration, the magnetic bead 2 has a favorable sedimentation characteristic, and is excellent in suitability for a magnetic separation operation. Accordingly, for example, when the magnetic bead dispersion 4 is collected by the pipette 44 or the like and dispensed into the container 1, it is possible to sufficiently reduce the variation in dispensing amount of the magnetic bead 2 during collection or dispensing. By using such a magnetic bead 2 in the biological substance extraction method, even if a certain time is required for the operation of collection or dispensing, a desired amount of the magnetic bead 2 can be dispensed into the container 1. As a result, it is possible to reduce a variation in extraction amount of the biological substance, and it is possible to improve accuracy of quantitative analysis of the extracted biological substance.

In addition, since the magnetic metal powder 22 is a metal particle, saturation magnetization thereof is high. Therefore, the magnetic bead 2 can shorten the time required for magnetic separation.

In addition, when the magnetic bead 2 according to the embodiment is charged in a spectroscopic cell (container) in the state of the dispersion obtained by dispersing the magnetic bead 2 in water, and a magnet having a surface magnetic flux density of 180 mT is disposed at a distance of 2.0 mm from an inner wall of the spectroscopic cell, a time until an initial absorbance of the dispersion attenuates to 10% of an absorbance at the time when the magnet is disposed is preferably shorter than 60 seconds.

According to such a configuration, the magnetic bead 2 has a favorable magnetic separation characteristic, and is excellent in the suitability for the magnetic separation operation. Accordingly, the time required for the magnetic separation operation can be sufficiently shortened. As a result, it is possible to speed up the entire testing of the biological substance.

In addition, the magnetic metal powder 22 is preferably composed of a Fe-based alloy and preferably contains an amorphous structure or a nanocrystal structure. When the magnetic metal powder 22 is composed of the Fe-based alloy, the magnetic metal powder 22 can have high saturation magnetization and high magnetic permeability even when a particle size is small. Accordingly, the time required for the magnetic separation of the magnetic bead 2 can be further shortened. In addition, according to the amorphous structure or the nanocrystal structure, the coercive force Hc of the magnetic bead 2 has a low value. Accordingly, dispersibility of the magnetic bead 2 in a liquid can be improved. As a result, when the application of the external magnetic field is turned off, a contact area between the magnetic bead 2 and the liquid 3 can be increased, and thus adsorption efficiency of the biological material adsorbed to the magnetic bead 2, washing efficiency of the magnetic bead 2, elution efficiency of the biological material adsorbed to the magnetic bead 2, and the like can be easily increased.

The coercive force Hc of the magnetic bead 2 is preferably 1500 A/m or less. Accordingly, aggregation of the magnetic beads 2 can be reduced, and the magnetic bead 2 can be more uniformly dispersed in a liquid.

In addition, the saturation magnetization of the magnetic bead 2 is preferably 50 emu/g or more. Accordingly, since the moving speed of the magnetic bead 2 in a magnetic field can be increased, the time required for the magnetic separation can be shortened. In addition, when the saturation magnetization of the magnetic bead 2 is within the above range, a sufficiently high adsorption force is obtained, and therefore, when the magnetically separated liquid 3 is discharged, discharge of the magnetic bead 2 together with the liquid 3 can be prevented.

In addition, the average particle size D50 of the magnetic bead 2 is preferably 0.5 μm or more and 50 μm or less, and the ratio D90/D50 of the 90% particle size D90 in the particle size distribution of the magnetic bead 2 to the average particle size D50 is preferably 2.00 or less. Accordingly, since a content of coarse particles is low, it is possible to prevent the coarse particles from attracting and aggregating relatively small surrounding particles and thus forming aggregates. When aggregates are generated, the aggregates settle due to own weight, and the extraction efficiency may decrease and the testing time of the biological substance may increase accordingly. Therefore, when the ratio D90/D50 is within the above range, occurrence of these problems can be prevented.

3. Magnetic Bead Dispersion

Next, the magnetic bead dispersion 4 according to the embodiment will be described. As described above, the magnetic bead dispersion 4 shown in FIG. 2 contains the magnetic bead 2 and the dispersion medium 40.

Examples of the dispersion medium 40 include water, saline, polar organic solvents such as alcohols, and aqueous solutions thereof. Examples of the water include sterile water and pure water. Examples of the alcohols include ethanol and isopropyl alcohol.

A concentration of the magnetic bead 2 in the magnetic bead dispersion 4 is not particularly limited as long as sufficient uniformity can be secured by stirring the magnetic bead dispersion 4.

A surfactant may be added for the purpose of improving dispersibility of the magnetic bead 2 in the magnetic bead dispersion 4. Examples of the surfactant include a nonionic surfactant, a cationic surfactant, an anionic surfactant, and an amphoteric surfactant.

Examples of the nonionic surfactant include a Triton (registered trademark)-based surfactant such as Triton-X and a Tween (registered trademark)-based surfactant such as Tween 20, and acyl sorbitan. Examples of the cationic surfactant include dodecyltrimethylammonium bromide, dodecyltrimethylammonium chloride, and cetyltrimethylammonium bromide. Examples of the anionic surfactant include sodium dodecyl sulfate, sodium N-lauroylsarcosine (SDS), sodium colate, sodium lauryl sulfate, and sarcosine. Examples of the amphoteric surfactant include phosphatidylethanolamine. These surfactants may be used alone or two or more thereof may be used in combination.

A content of the surfactant in the magnetic bead dispersion 4 is preferably equal to or larger than a critical micelle concentration of the surfactant. The critical micelle concentration is also referred to as cmc, and refers to a concentration at which molecules of a surfactant dispersed in a liquid are aggregated to form a micelle. When the content of the surfactant is equal to or larger than the critical micelle concentration, the surfactant easily forms a layer around the magnetic bead 2. Thereby, the effect of reducing aggregation of the magnetic beads 2 can be further improved.

The content of the surfactant is not limited to being equal to or larger than the critical micelle concentration, and may be less than the critical micelle concentration. For example, the content of the surfactant in the magnetic bead dispersion 4 is preferably 0.05% by mass or more and 3.0% by mass or less, regardless of the critical micelle concentration.

Further, a preservative is preferably added in order to impart long-term storability and a preservative effect to the magnetic bead dispersion 4. Examples of the preservative include sodium azide. A concentration of the added preservative is preferably 0.02% by mass or more and less than 0.1% by mass. When the concentration is less than 0.02% by mass, the long-term storability and the preservative effect may not be sufficient, and when the concentration is 0.1% by mass or more, the extraction efficiency of the biological substance may decrease.

In addition, a buffer for pH adjustment may be added. Examples of the buffer include a Tris buffer.

As described above, the magnetic bead dispersion 4 according to the embodiment contains the magnetic bead 2 and the dispersion medium 40 in which the magnetic bead 2 is dispersed.

As described above, the magnetic bead 2 has a favorable sedimentation characteristic, and is excellent in suitability for the magnetic separation operation. Therefore, when the magnetic bead dispersion 4 is collected by the pipette 44 or the like and dispensed into the container 1, it is possible to sufficiently reduce the variation in dispensing amount of the magnetic bead 2 during collection or dispensing. By using such a magnetic bead dispersion 4 in the biological substance extraction method, even if a certain time is required for the operation of collection or dispensing, a desired amount of the magnetic bead 2 can be dispensed into the container 1. As a result, it is possible to reduce a variation in extraction amount of the biological substance, and it is possible to improve accuracy of quantitative analysis of the extracted biological substance.

Although the magnetic bead and the magnetic bead dispersion according to the present disclosure are described above based on the shown embodiment, the present disclosure is not limited thereto. For example, the magnetic bead dispersion according to the present disclosure may be a dispersion in which any component is added to the above-described embodiment.

EXAMPLES

Next, specific examples of the present disclosure will be described.

4. Preparation of Magnetic Bead Dispersion

4.1. Example 1

First, a coating-film-attached magnetic powder containing a magnetic metal powder having an amorphous structure as a main structure and a silicon oxide film (silica film) with which a particle surface of the magnetic metal powder was coated was prepared as a magnetic bead. An alloy composition of the magnetic metal powder was $Fe_{73}Si_{11}Cr_{2}B_{11}C_{3}$, and a main structure thereof was an amorphous structure. Numerical values in the composition formula represent atom %. In addition, when this composition formula is expressed in terms of a mass ratio, Fe is 87.8% by mass, Si is 6.65% by mass, Cr is 2.24% by mass, B is 2.56% by mass, and C is 0.78% by mass. In addition, an average thickness of the coating layer, a true specific gravity of the magnetic bead, an average particle size D50, a ratio D90/D50, saturation magnetization, and a coercive force are as shown in Table 1.

The magnetic bead and pure water were charged in a container and stirred for 10 minutes with a vortex mixer to prepare a magnetic bead dispersion. A concentration of the magnetic bead in the magnetic bead dispersion was 0.1% by mass.

4.2. Examples 2 to 9

Magnetic bead dispersions were prepared in the same manner as in Example 1 except that magnetic beads having characteristics shown in Table 1 were used.

4.3. Comparative Examples 1 and 2

Magnetic bead dispersions were prepared in the same manner as in Example 1 except that magnetic beads having characteristics shown in Table 1 were used. As shown in Table 1, the magnetic beads used in Comparative Examples 1 and 2 are composite particles in which a ferrite powder is dispersed in a polymer matrix.

4.4. Comparative Example 3

A magnetic bead dispersion was prepared in the same manner as in Example 1 except that a magnetic bead having characteristics shown in Table 1 was used.

5. Characteristics of Magnetic Bead Dispersion 5.1. Sedimentation Characteristic A sedimentation evaluation time was obtained for the magnetic bead dispersion in each of Examples and Comparative Examples. Then, the obtained sedimentation evaluation time was evaluated in light of the following evaluation criteria. Evaluation results are shown in Table 1. In addition, the sedimentation characteristics in Example 1 and Comparative Example 1 are shown in FIG. 7.

A: the sedimentation evaluation time is 180 seconds or longer

B: the sedimentation evaluation time is 90 seconds or longer and shorter than 180 seconds C: the sedimentation evaluation time is shorter than 90 seconds 5.2. Magnetic Separation Characteristic A magnetic separation evaluation time was obtained for the magnetic bead dispersion in each of Examples and Comparative Examples. Then, the obtained magnetic separation evaluation time was evaluated in light of the following evaluation criteria. Evaluation results are shown in Table 1. In addition, the magnetic separation characteristics in Example 1 and Comparative Example 1 are shown in FIG. 7.

A: the magnetic separation evaluation time is shorter than 40 seconds

B: the magnetic separation evaluation time is 40 seconds or longer and shorter than 60 seconds C: the magnetic separation evaluation time is 60 seconds or longer 5.3. Ratio A1/A2

For the magnetic bead dispersion in each of Examples and Comparative Examples, a ratio A1/A2 of a residual absorbance A1 to a residual absorbance A2 was calculated, in which A1 was a residual absorbance after 60 seconds since a measurement of the sedimentation characteristic was started, and A2 was a residual absorbance after 60 seconds since a measurement of the magnetic separation characteristic was started. A calculation result is shown in Table 1.

6. Evaluation of Magnetic Bead Dispersion 6.1. Evaluation of Variation in Dispensing Amount of Magnetic Bead The magnetic bead dispersion in each of Examples and Comparative Examples was stirred with a vortex mixer for 10 minutes, and then left to stand for 120 seconds.

Next, a predetermined amount of the magnetic bead dispersion after being left to stand was collected with a pipette.

Next, a certain amount of the magnetic bead dispersion was dispensed from the pipette into separate microtubes whose weights were measured in advance. Next, a weight of each of the microtubes after dispensing the certain amount of the magnetic bead dispersion was measured again. Then, assuming that a dispensing amount of the liquid was constant, an increase in weight was calculated as a dispensing amount of the magnetic bead.

The above operation was performed ten times for each magnetic bead dispersion, and a variation in dispensing amount of the magnetic bead was calculated. The variation in dispensing amount of the magnetic bead was defined as a difference (range) between a maximum value and a minimum value of the dispensing amount of the magnetic bead. Then, the obtained variation was relatively evaluated in light of the following evaluation criteria.

A: the variation in dispensing amount of the magnetic bead is very small

B: the variation in dispensing amount of the magnetic bead is slightly small

C: the variation in dispensing amount of the magnetic bead is slightly large

D: the variation in dispensing amount of the magnetic bead is very large

Evaluation results are shown in Table 1.

6.2. Evaluation of Loss of Magnetic Bead

Each magnetic bead dispersion dispensed into the microtube in 6.1 was stirred by a vortex mixer for 10 seconds, and then the microtube was set in a magnetic stand and left to stand. As the magnetic stand, a stand in which a magnet having a surface magnetic flux density of 180 mT was disposed at a distance of 2.0 mm from an inner wall of the microtube was used. After a lapse of 20 seconds since the standing was started, a supernatant was aspirated with a pipette and collected into another microtube.

The collected supernatant was subjected to an absorbance measurement. For the absorbance measurement, a spectrophotometer Nanodrop One manufactured by Thermo Fisher Scientific K. K. was used. Then, a concentration of the magnetic bead contained in the collected supernatant was quantified based on a result of the absorbance measurement at a wavelength of 550 nm. In the quantification, a calibration curve measured for a plurality of samples in which the concentration of the magnetic bead was known was used.

Next, a magnetic bead loss rate was evaluated based on the calculated magnetic bead concentration. The magnetic bead loss rate is a ratio of loss of the magnetic bead to an introduced amount of the magnetic bead. The loss is an amount of the magnetic bead lost from the microtube when being mixed with the supernatant. Then, the magnetic bead loss rate was relatively evaluated in light of the following evaluation criteria.

A: the magnetic bead loss rate is very small

B: the magnetic bead loss rate is slightly small

C: the magnetic bead loss rate is slightly large

D: the magnetic bead loss rate is very large

Evaluation results are shown in Table 1.

TABLE 1

| | | | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|---|---|
| Characteristic of magnetic bead dispersion liquid | Composition of magnetic metal powder | — | Fe-based amorphous metal $Fe_{73}Si_{11}Cr_2B_{11}C_3$ | | | | | Fe-based amorphous metal $Fe_{73}Si_{10}B_{15}C_2$ | | Fe-based crystal metal $Fe_{73}Si_{10}B_{15}C_2$ | Fe-based crystal metal $Fe_{88}Si_5Cr_7$ | Ferrite-containing polymer | | Fe-based crystal metal $Fe_{50}Ni_{50}$ |
| | Coating layer | — | | | | | | Silica | | | | | | Silica |
| | Average thickness of coating layer | nm | 33 | 45 | 52 | 31 | 48 | 49 | 42 | 5 | 29 | | | 45 |
| | True specific gravity | g/mL | 7 | 7 | 7 | 7 | 7 | 7 | 7 | 7 | 7 | 3.5 | 1.5 | 7 |
| | Average particle diameter D50 | µm | 3.4 | 1.7 | 0.9 | 10.5 | 45.7 | 5.0 | 10.0 | 55.0 | 4.0 | 4.6 | 1 | 45.0 |
| | Ratio D90/D50 | — | 1.73 | 1.51 | 1.54 | 2.12 | 1.81 | 1.89 | 2.35 | 1.68 | 1.56 | 1.63 | 1.94 | |
| | Saturation magnetization | emu/g | 150 | 150 | 150 | 113 | 114 | 151 | 143 | 115 | 184 | 22 | 35 | 154 |
| | Coercive force | A/m | 120 | 120 | 120 | 48 | 89 | 26 | 26 | 230 | 857 | 8500 | 1000 | 1015 |
| | Spontaneous sedimentation evaluation time | — | A | A | A | A | B | A | A | B | B | C | C | C |
| | Magnetic separation evaluation time | — | A | A | B | A | A | A | A | A | A | C | C | A |
| | Ratio A1/A2 | — | 49 | 33 | 20 | 25 | 19 | 52 | 48 | 18 | 16 | 7.6 | 3.3 | 9.2 |
| Evaluation result of magnetic bead dispersion liquid | Variation in dispensing amount of magnetic bead | — | A | A | A | A | B | A | A | C | C | D | D | D |
| | Magnetic bead loss rate | — | A | A | B | A | A | A | A | A | A | C | D | A |

As shown in Table 1, in the magnetic bead dispersion in each of Examples, the variation in dispensing amount of the magnetic bead was smaller than that in the magnetic bead dispersion in each of Comparative Examples. In addition, in the magnetic bead dispersion in each of Examples, the magnetic bead loss rate was smaller than that in the magnetic bead dispersion in each of Comparative Examples.

Therefore, it was confirmed that the magnetic bead and the dispersion thereof in each of Examples has suitability for a magnetic separation operation. That is, it was confirmed that the magnetic bead in each of Examples is uniformly dispersed and is difficult to spontaneously settle when the dispersion is prepared, and therefore, even if it takes time to collect and dispense, a desired amount of the magnetic bead can be dispensed, and dispensing accuracy of the dispensing operation is high. In addition, it was also confirmed that the magnetic bead in each of Examples has a high magnetic separation rate and a high magnetic adsorption force, and thus loss due to discharging together with the liquid is small. Therefore, it is presumed that when the magnetic bead according to the present disclosure is used for extraction of a biological substance, the magnetic bead can contribute to improvement of testing accuracy of the extracted biological substance.

What is claimed is:

1. A magnetic bead comprising:

a magnetic metal powder; and a coating layer with which a particle surface of the magnetic metal powder is coated, the coating layer being a composite containing silicon and one or more selected from the group consisting of Al, Ti, V, Nb, Cr, Sn, and Zr, wherein the coating layer includes a functional group configured to enhance binding of a biological substance to the magnetic bead, the functional group being selected from the group consisting of an OH group, an epoxy group, a trimethylsilyl group, and a NHS group, an average particle size D50 of the magnetic bead is 0.5 μm or more and 50 μm or less, a ratio D90/D50 of a 90% particle size D90 in a particle size distribution of the magnetic bead to the average particle size D50 is 2.00 or less, and when the magnetic bead is left to stand in a state of a dispersion obtained by dispersing the magnetic bead in water, a time until an initial absorbance of the dispersion attenuates to 80% of an absorbance when the standing is started is 90 seconds or longer.

2. The magnetic bead according to claim 1, wherein when the magnetic bead is charged in a container in the state of the dispersion obtained by dispersing the magnetic bead in water and a magnet having a surface magnetic flux density of 180 mT is disposed at a distance of 2.0 mm from an inner wall of the container, a time until the initial absorbance of the dispersion attenuates to 10% of an absorbance when the magnet is disposed is shorter than 60 seconds.

3. The magnetic bead according to claim 1, wherein the magnetic metal powder is composed of a Fe-based alloy and contains an amorphous structure or a nanocrystal structure.

4. The magnetic bead according to claim 1, wherein a coercive force of the magnetic bead is 1500 A/m or less.

5. The magnetic bead according to claim 1, wherein saturation magnetization of the magnetic bead is 50 emu/g or more.

6. A magnetic bead dispersion comprising:

the magnetic bead according to claim 1; and a dispersion medium in which the magnetic bead is dispersed.

* * * * *